United States Patent
Kadam et al.

(10) Patent No.: US 12,235,942 B2
(45) Date of Patent: Feb. 25, 2025

(54) AUTHENTICATION BASED INTEGRATED LOCK MECHANISM ON COMPUTING DEVICES FOR ENHANCED USER EXPERIENCE

(71) Applicant: Intel Corporation, Santa Clara, CA (US)

(72) Inventors: Rushikesh Sitaram Kadam, Bangalore (IN); Sajal Kumar Das, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 17/703,775

(22) Filed: Mar. 24, 2022

(65) Prior Publication Data
US 2022/0215081 A1   Jul. 7, 2022

(51) Int. Cl.
*G06F 21/32* (2013.01)
*E05B 17/22* (2006.01)
*E05B 47/00* (2006.01)
*E05B 73/00* (2006.01)
*G07C 9/00* (2020.01)

(52) U.S. Cl.
CPC .............. *G06F 21/32* (2013.01); *E05B 17/22* (2013.01); *E05B 47/0001* (2013.01); *E05B 73/0005* (2013.01); *G07C 9/00944* (2013.01)

(58) Field of Classification Search
CPC .......... E05B 17/00; E05B 17/22; E05B 39/00; E05B 40/00; E05B 41/00; E05B 42/00; E05B 43/00; E05B 44/00; E05B 45/00; E05B 47/00; E05B 47/0001; E05B 81/00; E05B 81/04; E05B 73/00; E05B 73/0005; G06F 21/00; G06F 21/30; G06F 21/305; G06F 21/31; G06F 21/32; G07C 9/00; G07C 9/00944
USPC ............................................. 70/58, 57, 57.1
See application file for complete search history.

(56) References Cited

U.S. PATENT DOCUMENTS

| | | | |
|---|---|---|---|
| 8,066,308 B2 * | 11/2011 | Lee ......................... | E05C 19/06 292/49 |
| 2015/0319294 A1 * | 11/2015 | Sudhir ................... | H04W 12/08 455/411 |
| 2017/0018130 A1 * | 1/2017 | Robinson ................. | G07C 9/28 |
| 2019/0228602 A1 * | 7/2019 | Fowler ................ | E05B 19/0011 |
| 2022/0012317 A1 * | 1/2022 | Byrne .................... | G06V 10/17 |
| 2022/0028193 A1 * | 1/2022 | Ehlert .................... | G16H 40/20 |

OTHER PUBLICATIONS

Electronics Tutorials, "Electrical Relay", Available Online at <https://www.electronics-tutorials.ws/io/io_5.html>, Oct. 10, 2021, 7 pages.

* cited by examiner

*Primary Examiner* — Nathan Cumar
(74) *Attorney, Agent, or Firm* — NICHOLSON DE VOS WEBSTER & ELLIOTT LLP (57) ABSTRACT

A system and method of authentication-based operation of a lock mechanism include detecting an authentication signal from an electronic authentication module, authenticating the authentication signal using a stored user profile, wherein the stored user profile is used for login authentication purposes and includes at least user data, and when the authentication signal is authenticated, activating an electromechanical mechanism to release a latch switch associated with a lock mechanism.

19 Claims, 6 Drawing Sheets

AUTHENTICATION BASED INTEGRATED LOCK MECHANISM ON COMPUTING DEVICES FOR ENHANCED USER EXPERIENCE

FIELD

Embodiments relate generally to computer security, and more particularly, to an authentication based integrated lock mechanism on computing devices for enhanced user experience.

BACKGROUND

Typically, a Kensington lock is used as part of an anti-theta system consisting of a small metal-reinforced hole found on mobile computing devices combined with a metal anchor attached to a rubberized metal cable secured with a key or combination lock. To lock the anti-theft system a user must insert the lock into the mobile computing device and insert a physical key into the lock to lock and unlock the anti-theft system. Each Kensington lock operates with a unique physical key. A user is required to always carry a physical key with them to implement the anti-theft system. In this regard, the physical key may easily and often be lost, forgotten, or stolen. Additionally, the Kensington lock and cable is heavy and bulky making it inconvenient to carry around with a mobile computing device to different locations such as an office or coffee shop. As such, current anti-theft systems are inconvenient, inefficient, and inadequate for preventing the theft of a mobile computing device.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the technology described herein provide a method and system for an authentication based (e.g., fingerprint based) integrated lock mechanism on computing devices for enhanced user experience.

Typically, a Kensington lock is used as part of an anti-theft system consisting of a small metal-reinforced hole found on mobile computing devices combined with a metal anchor attached to a rubberized metal cable secured with a key or combination lock. To lock the anti-theft system a user must insert the lock into the mobile computing device and insert a physical key into the lock to lock and unlock the anti-theft system. Each Kensington lock operates with a unique physical key. A user is required to always carry a physical key with them to implement the anti-theft system. In this regard, the physical key may easily and often be lost, forgotten, or stolen. Additionally, the Kensington lock and cable is heavy and bulky making it inconvenient to carry around with a mobile computing device to different locations such as an office or coffee shop. As such, current anti-theft systems are inconvenient, inefficient, and inadequate for preventing the theft of a mobile computing device.

The novel technology described herein facilitates operating a lock mechanism in a computing device casing using authentication instead of requiring a physical key. For example, the computing device may include an electronic authentication module and an associated firmware stack for authentication (e.g., an authentication mechanism). In one example, the electronic authentication module may include a fingerprint scanner, a face scanner, an iris scanner, and the like. In one implementation, the authentication used for operating the lock mechanism is fingerprint-based authentication. For example, the authentication mechanism and/or authentication circuitry may hereinafter be referred to as fingerprint mechanism and/or fingerprint circuitry. In one example, the computing device may include a fingerprint scanner and an associated firmware stack for user fingerprint enrollment and subsequently matching the enrolled data for user authentication. In this regard, the already existing fingerprint authentication used for login purposes may be used for operating the lock mechanism instead of requiring the physical key.

It is appreciated that while the present disclosure describes a fingerprint mechanism, a fingerprint scanner, fingerprint authentication, and the like, relative to the novel technology herein, any authentication method, authentication module and/or electronic authentication mechanism that is electronically implemented in and/or with a computing device may be used to operate the lock/unlock mechanism described herein and/or relative to the novel technology, processes, systems, and methods described herein. For example, in addition to the fingerprint mechanism, the electronic authentication mechanism may include face recognition, iris recognition, and the like.

Embodiments may be employed for authenticating an authentication signal (e.g., a fingerprint) of a user of the computing device and when the user is authenticated, activating an electromechanical mechanism to facilitate unlocking the lock mechanism such that a lock (e.g., a Kensington lock) may be removed from the lock mechanism of the computing device. In this regard, the lock mechanism may be compatible with a Kensington lock and/or Kensington lock cable. In one example, the lock mechanism may be unlocked using a physical key associated with a lock inserted into the lock mechanism such that the lock may be removed from the lock mechanism of the computing device. In this regard, when errors occur with the computing device (e.g., a dead battery, no power, a corrupted operating system, and the like), the lock mechanism may be moved to an unlock position and the lock may be removed from the computing device.

Figure 1:
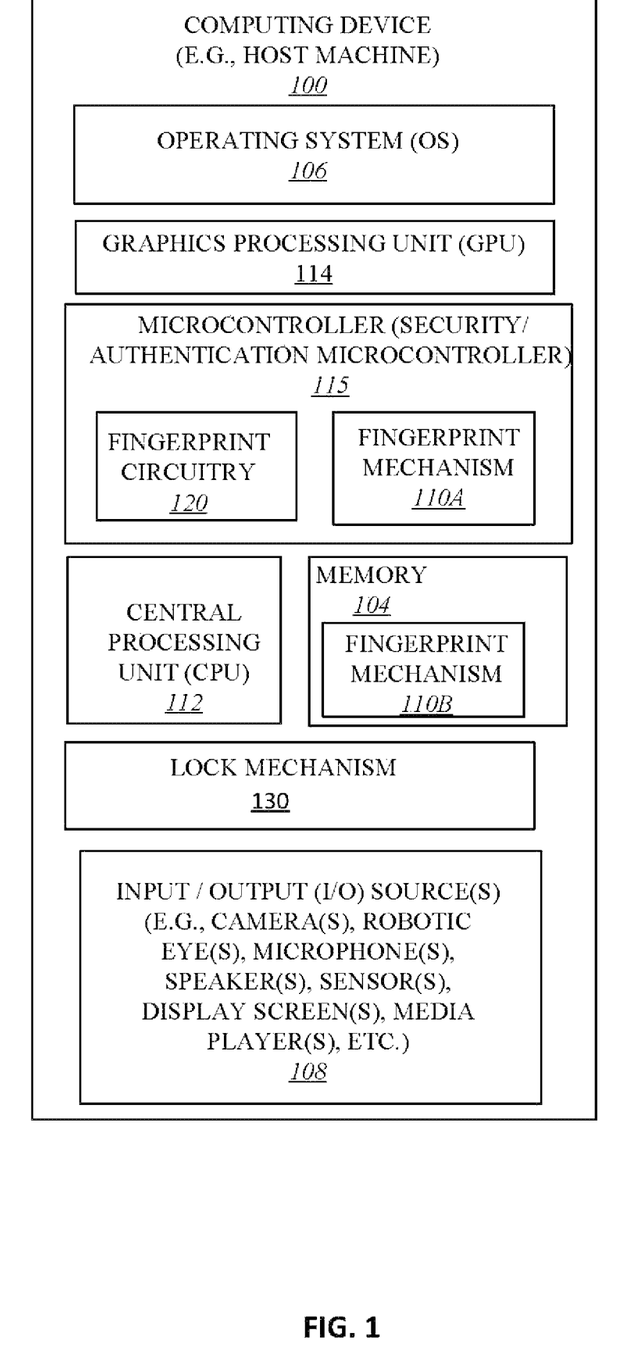
FIG. 1 illustrates a computing device employing a fingerprint mechanism according to some embodiments.

FIG. 1 illustrates a computing device 100 employing a fingerprint mechanism 110A and a fingerprint mechanism 110B according to one embodiment. Computing device 100 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip. For example, computing device 100 comprises a data processing device having one or more processors including (but not limited to) central processing unit 112 and graphics processing unit 114 that are co-located on a common semiconductor package.

As illustrated, in one embodiment, computing device 100 may include any number and type of hardware and/or software components, such as (without limitation) graphics processing unit ("GPU" or simply "graphics processor") 114, central processing unit ("CPU" or simply "application processor") 112, memory 104, network devices, drivers, and/or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user. Computing device 100 may include a lock mechanism 130 for locking/unlocking the computing device 100.

It is to be appreciated that a lesser or more equipped system than the example described above may be preferred for certain implementations. Therefore, any configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

Figure 2:
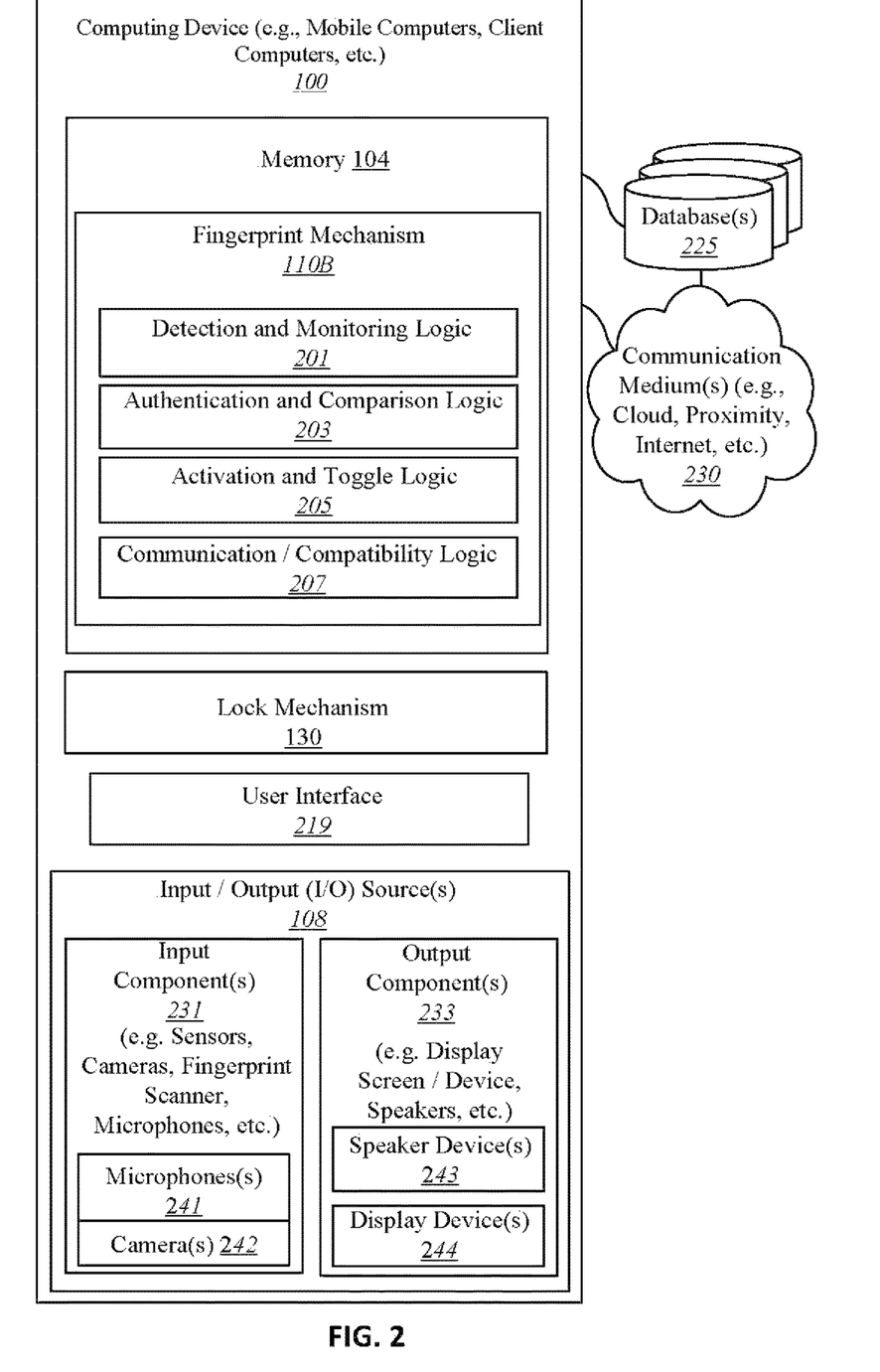
FIG. 2 illustrates the fingerprint mechanism of FIG. 1 according to some embodiments.
Figure 5:
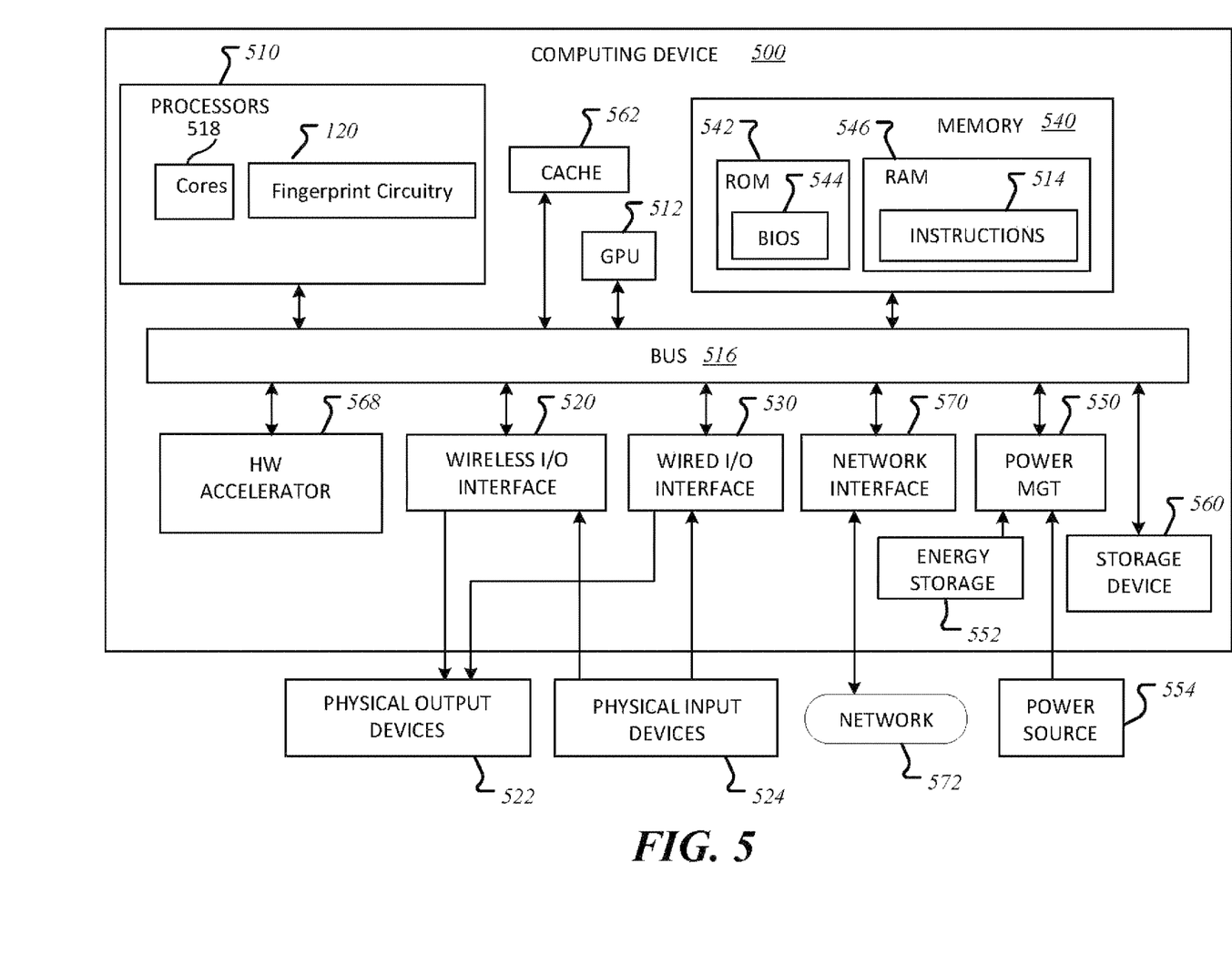
FIG. 5 is a schematic diagram of an illustrative electronic computing device to perform authentication-based lock mechanism processing according to some embodiments.

In one embodiment, as illustrated, the fingerprint mechanism 110A may be hosted by or part of microcontroller (e.g., security/authentication microcontroller) 115 or firmware of microcontroller 115; for example, fingerprint mechanism 110A may be embedded in or implemented as part of the processing hardware of microcontroller 115 in the form of fingerprint circuitry 120. In another embodiment, fingerprint mechanism 110B may be hosted by memory 104 (e.g., in the form of instructions stored in memory 104 as shown in FIG. 2) in communication with I/O source(s) 108, such as sensors, microphones, speakers, etc., of computing device 100. In another embodiment, fingerprint mechanism 110B may be part of or hosted by operating system 106. Similarly, in yet another embodiment, fingerprint mechanism 110B may be hosted by or part of central processing unit ("CPU" or simply "application processor") 112 in the form of fingerprint circuitry 120 as shown in the processor of FIG. 5.

For example, fingerprint circuitry 120 and/or any elements of fingerprint mechanisms 110A/110B may be implemented by one or more analog or digital circuits, logic circuits, programmable processors, programmable controllers, GPUs, digital signal processors (DSPs), application specific integrated circuits (ASICs), programmable logic devices (PLDs), and/or field programmable logic devices (FPLDs).

It is contemplated that this novel technique is not limited to a software implementation or a hardware implementation and, as will be further described in this document, this novel technique may be applied and implemented in software, hardware, firmware, or any combination thereof. It is, therefore, further contemplated that embodiments are not limited to certain implementation or hosting of fingerprint mechanisms 110A/110B and that one or more portions or components of fingerprint mechanisms 110A/110B may be employed or implemented as hardware, software, firmware, or any combination thereof. Further, as used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, a data processing machine, a data processing device, network of computers, or other electronic devices, may result in the one or more machines carrying out operations in accordance with embodiments described herein. As described with reference to FIG. 1, a machine may include one or more processors, such as a CPU, a GPU, etc. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this disclosure to cover a purely software and/or firmware implementation, at least one element of fingerprint circuitry 120 and/or fingerprint mechanism 110A and/or fingerprint mechanism 110B may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of fingerprint circuitry 120 or fingerprint mechanisms 110A/100B may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

FIG. 2 illustrates fingerprint mechanism 110B of FIG. 1 according to some embodiments. For brevity, many of the details already discussed with reference to FIG. 1 are not repeated or discussed hereafter. In one embodiment, fingerprint mechanism 110B may include any number and type of elements or components, such as (but not limited to): detection and monitoring logic 201; authentication and comparison logic 203; activation and toggling logic 205; and communication/compatibility logic 207. Computing device 100 further hosts lock mechanism 130 and user interface 219.

In the illustrated embodiment, computing device 100 represents a mobile computing device (also referred to as "mobile device"). In one example, the mobile device may be a client computing device.

Computing device 100 further includes user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), microphone(s) 241, sensors, detectors, keyboards, mice, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, an intranet, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241, camera(s) 242, capacitors, radio components, radar components, scanners (e.g., fingerprint scanners), and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software, hardware, firmware, and/or any combination thereof. For example, logic may itself be or include or be associated with circuitry at one or more devices, such as fingerprint circuitry 120 hosted by microcontroller 115, respectively, of FIG. 1 having to facilitate or execute the corresponding logic to perform certain tasks.

Embodiments provide for a novel technique, as facilitated by fingerprint mechanism 110B for operating a lock mechanism (e.g., the lock mechanism 130) using fingerprint authentication. In one embodiment, detection and monitoring logic 201 monitors and detects an authentication signal from an electronic authentication module. For example, the electronic authentication module may be a fingerprint scanner that is part of input component 231, as discussed above. In this regard, a user of the computing device 100 may scan their fingerprint using a fingerprint scanner. In response, the detection and monitoring logic 201 may detect an authentication signal (e.g., a fingerprint signal). The authentication signal may include fingerprint data of the user.

In one embodiment, the authentication and comparison login 203 authenticates the authentication signal using a stored user profile. In one example, the stored user profile includes at least a registered user profile including user fingerprint data. For example, a user may be required to login to the operating system of the computing device 100. The first time a user logs in using the electronic authentication module (e.g., the fingerprint scanner), a user profile including the user fingerprint data may be registered. In this regard, during subsequent logins using the fingerprint scanner, the user may be authenticated to the operating system. As such, in some examples, authentication and comparison logic 203 compares the detected authentication signal from the electronic authentication module (e.g., fingerprint scanner) with the user fingerprint data in the stored user profile. When there is a match, the user may be authenticated. As discussed above, the computing device 100 may include a fingerprint scanner module and an associated firmware stack for user fingerprint enrollment and subsequently matching the enrolled data for user authentication. In this regard, the already existing fingerprint authentication used for login purposes may be reused for operating the lock mechanism 130 such as activating and/or toggling an electromechanical mechanism to release a latch switch associated with the lock mechanism 130. In this regard, system cost and size are reduced, and implementation of the novel technology described herein is simplified.

When the authentication signal/user is authenticated, activation and toggle logic 205 activates an electromechanical mechanism to release a latch switch associated with a lock mechanism. In one example, activation and toggle logic 205 activates an electromechanical mechanism to release a latch switch associated with a lock mechanism when a user is already logged into the operating system of the computing device 100. As such, the electromechanical mechanism may be activated in situations including when a user is logging into the computing device 100 using the fingerprint scanner and/or when a user wants to activate the electromechanical mechanism to unlock the lock mechanism. In this regard, when an input is received at the fingerprint scanner (e.g., a user touches the fingerprint scanner to scan their finger), login authentication is reported to the operating system (e.g., using already existing fingerprint authentication for login purposes) and the electromechanical mechanism is activated to release the latch switch associated with the lock mechanism 130.

In one example, when a user is already logged in to the computing device 100 and an input is received at the fingerprint scanner (e.g., a user touches the fingerprint scanner to scan their finger), a second login authentication notification may be neglected by the operating system and the electromechanical mechanism is activated to release the latch switch associated with the lock mechanism 130. In another example, when a user is intending to log in to the computing device 100 but not unlock the lock mechanism 130, and an input is received at the fingerprint scanner (e.g., for login authentication), the user is authenticated for login by the operating system and the electromechanical mechanism is activated to release the latch switch associated with the lock mechanism 130. As discussed in further detail below, the latch switch may be released for a short period of time (e.g., two seconds) and automatically return to the lock position after the short period of time passes. In this regard, the user is logged into the computing device 100 and the lock mechanism 130 remains locked after the short period of time passes (e.g., after two seconds); ultimately, keeping the computing device 100 secure.

Figure 3A:
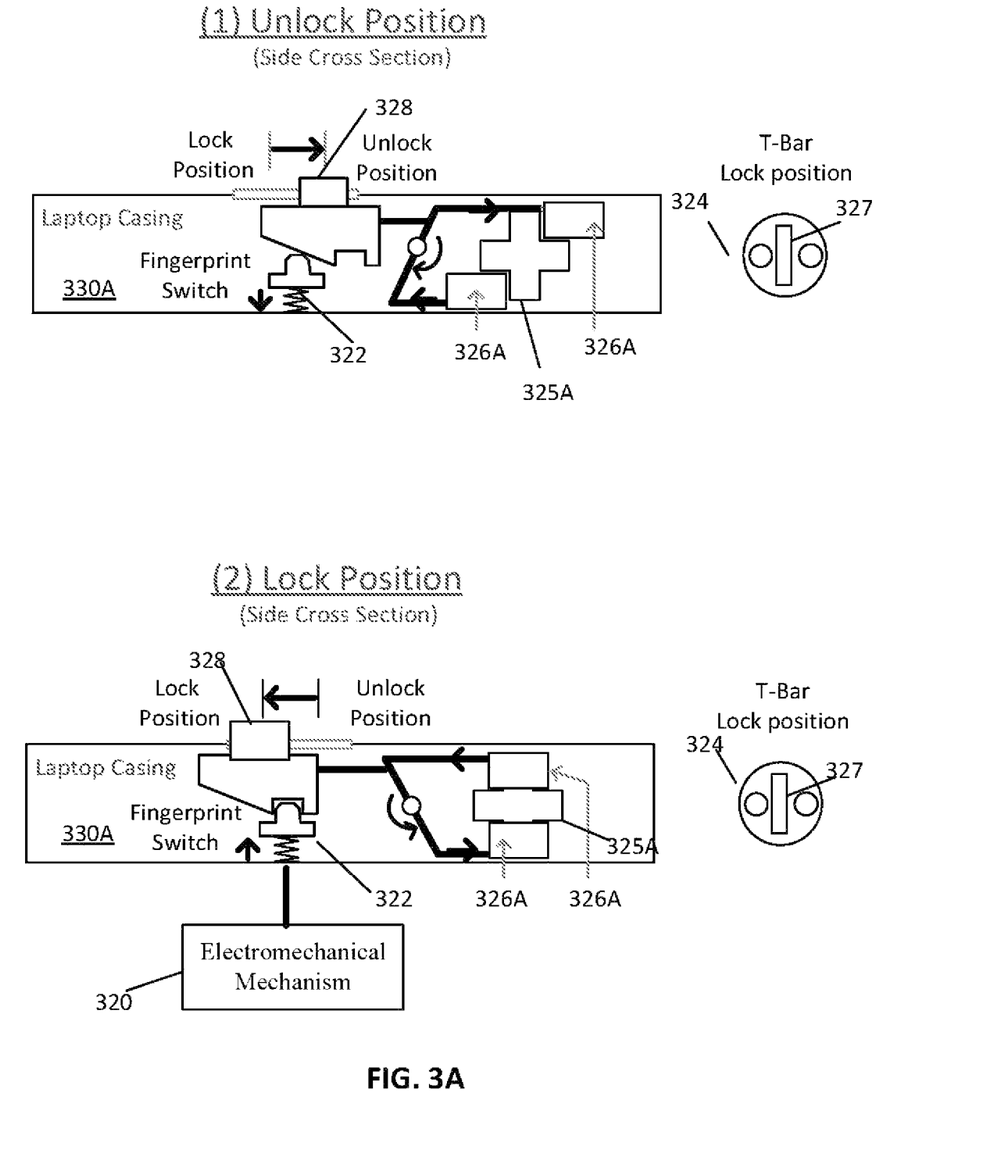
FIG. 3A illustrates an exemplary lock mechanism according to some embodiments.
Figure 3B:
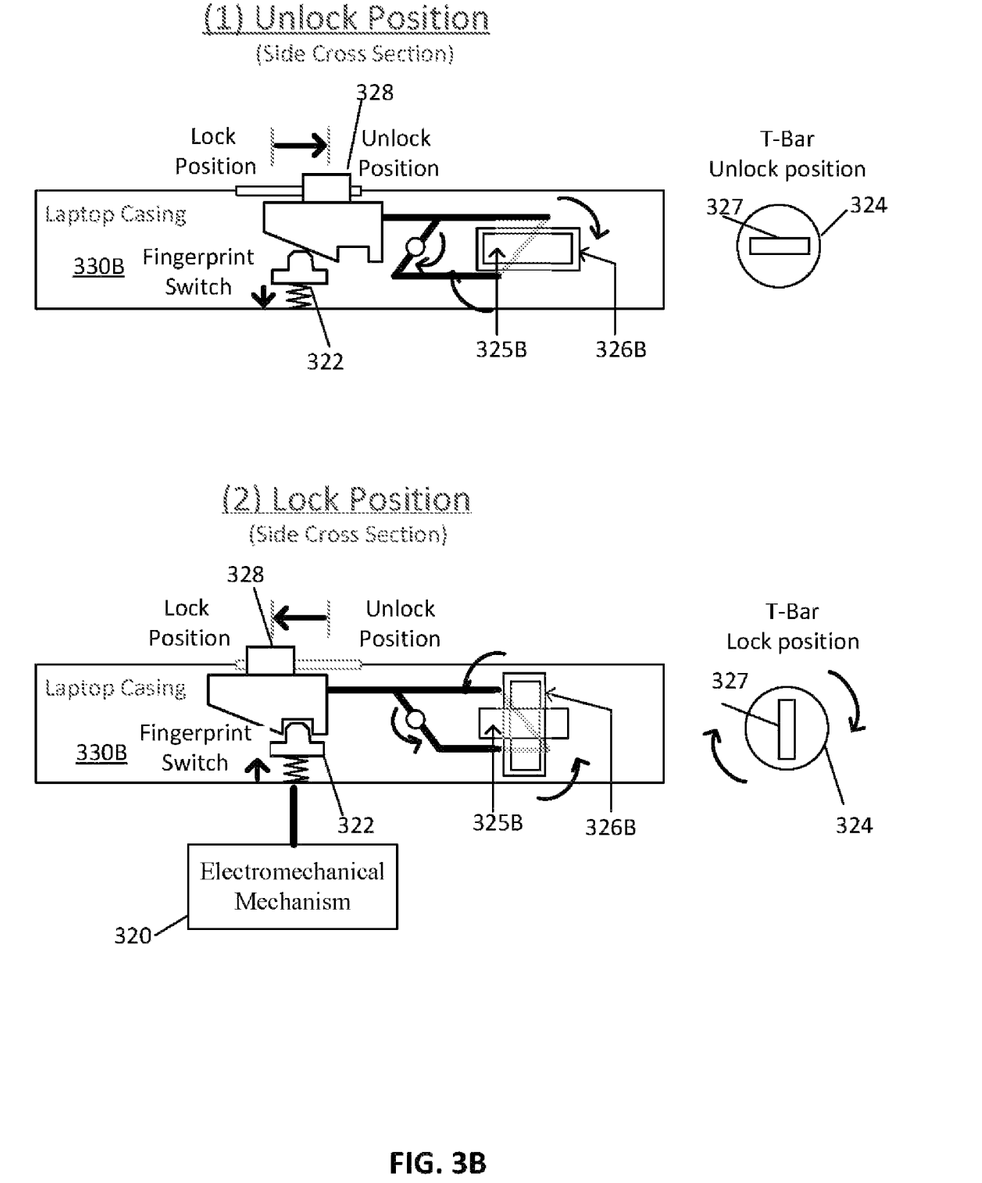
FIG. 3B illustrates an exemplary lock mechanism according to some embodiments.

For example, with reference now to FIG. 3A and FIG. 3B, the activation and toggle logic 205 activates the electromechanical mechanism 320 to release the latch switch 322 associated with the lock mechanism 330A of FIG. 3A and lock mechanism 330B of FIG. 3B. In one example, the lock mechanism 330A is compatible with a Kensington lock and a Kensington lock cable. In one example, the lock mechanism 330B is compatible with a generic and simple lock cable design having a T-bar head. In one example, the activation and toggle logic 205 toggles a general-purpose input/output (GPIO) signal that is sent to the electromechanical mechanism 320. When the GPIO signal is received by the electromechanical mechanism 320, the electromechanical mechanism 320 may facilitate the release of the latch switch 322. In one example, the latch switch 322 is a spring-loaded latch switch. In one example, the latch switch 322 is released for a predetermined amount of time. The predetermined amount of time may be a short amount of time such as two seconds. In another example, the short amount of time may be three seconds. In this regard, when the latch switch 322 is released, in response to a user input within the predetermined amount of time, the lock mechanism 330A and/or the lock mechanism 330B and/or slide button 328 may be moved to an unlock position. In one example, when the latch switch 322 is released, after the predetermined amount of time has passed and when the slide button 328 remains in the lock position, the latch switch 322 may timeout and auto latch the slide button 328 keeping the slide button 328 in the lock position.

In one example, the user input may include moving the slide button 328 to a lock and/or unlock position. In this regard, the slide button 328 facilitates locking and unlocking the lock mechanisms 330A/330B. For example, a user may move the slide button 328 to a lock position and an unlock position from outside the computing device 100. As discussed herein, the slide button 328 may be moved to the unlock position when the latch switch 322 has been released due to user authentication. Otherwise, the slide button 328 remains in the lock position; ultimately preventing theft of the computing device 100 from an unauthorized/unauthenticated person.

In the example of lock mechanism 330A illustrated in FIG. 3A, lock hole 325A is a plus symbol shaped lock hole. In one example, the lock hole 325A facilitates the insertion of the lock cable head 324 such that the lock cable head 324 may be locked. In one example, the lock cable head 324 may be locked after being inserted into lock hole 325A by a user moving the slide button 328 to the lock position. In one example, moving the slide button 328 to the lock position may slide metal plates 326A to lock the lock cable head 324 into the lock mechanism 330A and/or computing device 100

(e.g., laptop) casing. As illustrated in FIG. 3A, when the lock mechanism 330A is in the lock position, the metal plates 326A block the lock hole 325A preventing the lock cable head 324 from being removed from the computing device 100. When the lock mechanism 330A is in the unlock position, the metal plates 326A create a gap/space such that the lock hole 325A is open and the lock cable head 324 may be removed from the computing device 100.

When the lock cable head 324 is locked, the computing device 100 is securely attached to the lock cable (e.g., such as a Kensington lock cable). The lock cable head 324 may include a T-bar 327 for putting the lock cable head 324 in a lock position and an unlock position. As illustrated in FIG. 3A, the T-bar 327 is in a lock position. In one example, in order to lock the lock cable head 324 to secure the computing device 100, the T-bar 327 is set to the lock position. The T-bar 327 may be set to the lock position using a physical key. In other examples, the plus symbol shaped lock hole 325A facilitates backwards compatibility with existing Kensington locks. In yet other examples, the plus symbol shaped lock hole 325A facilitates overriding the fingerprint authentication technique with a physical key when errors occur with the computing device 100 such as a dead battery, no power, firmware corruption, and the like. The physical key may be configured to release the lock cable head 324 from the lock hole 325A.

In the example of lock mechanism 330B illustrated in FIG. 3B, lock hole 325B is a rectangular shaped lock hole. In one example, the lock hole 325B facilitates the insertion of the lock cable head 324 such that the lock cable head 324 may be locked. In one example, the lock cable head 324 may be locked after being inserted into lock hole 325B by a user moving the slide button 328 to the lock position. In one example, when the slide button 328 is moved to the lock position, a T-head buckle assembly 326B located around the lock hole 325B may rotate the T-bar 327 to the lock position to lock the lock cable head 324 into the lock mechanism 330B and/or computing device 100 (e.g., laptop) casing.

As illustrated in FIG. 3B, when the lock mechanism 330B is in the lock position, the T-bar 327 is in the lock position perpendicular to the lock hole 325B preventing the lock cable head 324 from being removed from the computing device 100. When the lock mechanism 330B is in the unlock position, the T-bar 327 is in the unlock position parallel to the lock hole 325B such that the lock hole 325B is open and the lock cable head 324 may be removed from the computing device 100. In one example, when the slide button 328 is moved to the unlock position, the T-head buckle assembly 326B may rotate the T-bar 327 to the unlock position and release the lock cable head 324 from the lock mechanism 330B and/or computing device 100.

It is contemplated that embodiments are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

It is contemplated that any number and type of components may be added to and/or removed from fingerprint mechanism 110A, fingerprint mechanism 110B and/or fingerprint circuitry 120 of FIG. 1 and FIG. 2 to facilitate various embodiments including adding, removing, and/or enhancing certain features. For brevity, clarity, and ease of understanding of fingerprint mechanism 110A, fingerprint mechanism 110B and/or fingerprint circuitry 120 of FIG. 1 and FIG. 2, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 4:
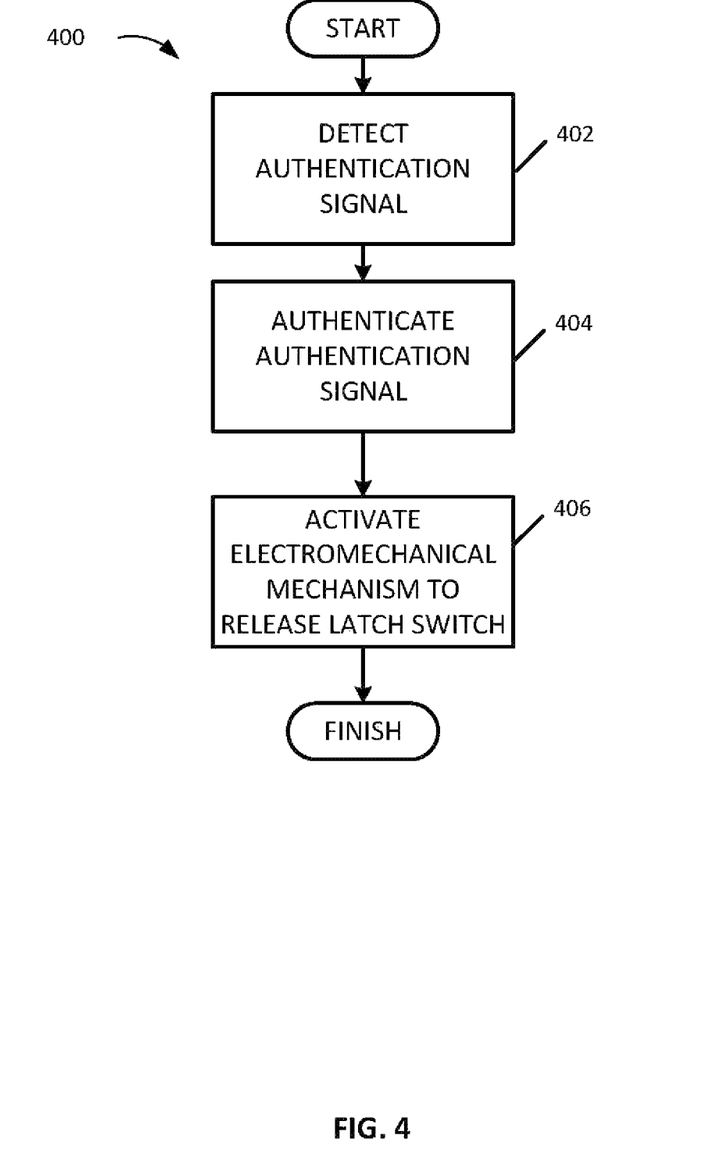
FIG. 4 illustrates a method for authentication-based operation of a lock mechanism according to some embodiments.

FIG. 4 illustrates a method 400 for authentication-based operation of a lock mechanism according to some embodiments. Method 400 may be implemented on a computing device or a similar electronic device capable of executing instructions through at least one processor. Process 400 may begin at operation 402, where an authentication signal is detected from an electronic authentication module. In one example, the authentication signal may include a fingerprint signal. In another example, the electronic authentication module may include a fingerprint scanner.

When an authentication signal is detected from an electronic authentication module, flow proceeds to operation 404 where the authentication signal is authenticated using a stored user profile. In one example, the stored user profile is used for login authentication purposes and includes at least user data. In this regard, the authentication signal is authenticated using an already existing authentication mechanism and/or authentication module within the computing device 100, such as a fingerprint mechanism (e.g., fingerprint mechanisms 110A/100B) and a fingerprint scanner. In another example, authenticating the authentication signal using a stored user profile may comprise comparing the detected authentication signal from the electronic authentication module with the user data in the stored user profile.

When the authentication signal is authenticated using a stored user profile, flow proceeds to operation 406 where an electromechanical mechanism (e.g., electromechanical mechanism 320) is activated to release a latch switch (e.g., 322) associated with a lock mechanism (e.g., lock mechanism 130). In one example, activating the electromechanical mechanism 320 to release the latch switch 322 associated with the lock mechanism 130 comprises toggling a GPIO signal. In one example, the latch switch 322 may be released for a predetermined amount of time. In one example, when the latch switch 322 is released, in response to a user input within the predetermined amount of time, the lock mechanism 130 may be moved to an unlock position. In one example, the lock mechanism 130 is compatible with a Kensington lock cable. The lock mechanism 130 may facilitate moving the lock mechanism 130 to an unlock position with a physical key. In one example, the latch switch 322 may be a spring-loaded latch switch.

FIG. 5 is a schematic diagram of an illustrative electronic computing device to perform authentication-based lock mechanism processing to some embodiments. In some embodiments, computing device 500 includes one or more processors 510 including processor cores 518 and fingerprint circuitry 120. In some embodiments, the computing device 500 includes one or more hardware accelerators 568. In some embodiments, the computing device is to implement processing of software-defined performance monitoring events, as provided in FIGS. 1-4 above.

The computing device 500 may additionally include one or more of the following: cache 562, a graphical processing unit (GPU) 512 (which may be the hardware accelerator in some implementations), a wireless input/output (I/O) interface 520, a wired I/O interface 530, system memory 540, power management circuitry 580, non-transitory storage device 560, and a network interface 570 for connection to a network 572. The following discussion provides a brief, general description of the components forming the illustrative computing device 500. Example, non-limiting computing devices 500 may include a desktop computing device, blade server device, workstation, laptop computer, mobile phone, tablet computer, personal digital assistant, or similar device or system.

In embodiments, the processor cores 518 are capable of executing machine-readable instruction sets 514, reading data and/or machine-readable instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 514 may include instructions to implement security processing, as provided in FIGS. 1-4.

The processor cores 518 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500 includes a bus 516 or similar communications link that communicably couples and facilitates the exchange of information and/or data between various system components including the processor cores 518, the cache 562, the graphics processor circuitry 512, one or more wireless I/O interface 520, one or more wired I/O interfaces 530, one or more storage devices 560, and/or one or more network interfaces 570. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 518 may include any number, type, or combination of currently available or future developed devices capable of executing machine-readable instruction sets.

The processor cores 518 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the computing device 500 may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500, for example by causing the processor cores 518 to load and/or execute one or more machine-readable instruction sets 514. In embodiments, at least some of the one or more machine-readable instruction sets 514 cause at least a portion of the processor cores 518 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to universal serial bus (USB), IEEE 1394 ("FireWire"), and similar.

The computing device 500 may include one or more communicably coupled, non-transitory, storage devices 560. The storage devices 560 may include one or more hard disk drives (HDDs) and/or one or more solid-state storage devices (SSDs). The one or more storage devices 560 may include any current or future developed storage appliances, network storage devices, and/or systems. Non-limiting examples of such storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 560 may include one or more removable storage devices, such as one or more flash drives, flash memories, flash storage units, or similar appliances or devices capable of communicable coupling to and decoupling from the computing device 500.

The one or more storage devices 560 may include interfaces or controllers (not shown) communicatively coupling the respective storage device or system to the bus 516. The one or more storage devices 560 may store, retain, or otherwise contain machine-readable instruction sets, data structures, program modules, data stores, databases, logical structures, and/or other data useful to the processor cores 518 and/or graphics processor circuitry 512 and/or one or more applications executed on or by the processor cores 518 and/or graphics processor circuitry 512. In some instances, one or more data storage devices 560 may be communicably coupled to the processor cores 518, for example via the bus 516 or via one or more wired communications interfaces 530 (e.g., Universal Serial Bus or USB); one or more wireless communications interface 520 (e.g., Bluetooth®, Near Field Communication or NFC); and/or one or more network interfaces 570 (IEEE 802.3 or Ethernet, IEEE 802.11, or Wi-Fi®, etc.).

Machine-readable instruction sets 514 and other programs, applications, logic sets, and/or modules may be stored in whole or in part in the system memory 540. Such machine-readable instruction sets 514 may be transferred, in whole or in part, from the one or more storage devices 560. The machine-readable instruction sets 514 may be loaded, stored, or otherwise retained in system memory 540, in whole or in part, during execution by the processor cores 518 and/or graphics processor circuitry 512.

The computing device 500 may include power management circuitry 580 that controls one or more operational aspects of the energy storage device 582. In embodiments, the energy storage device 582 may include one or more primary (i.e., non-rechargeable) or secondary (i.e., rechargeable) batteries or similar energy storage devices. In embodiments, the energy storage device 582 may include one or more supercapacitors or ultracapacitors. In embodiments, the power management circuitry 580 may alter, adjust, or control the flow of energy from an external power source 584 to the energy storage device 582 and/or to the computing device 500. The external power source 584 may include, but is not limited to, a solar power system, a commercial electric grid, a portable generator, an external energy storage device, or any combination thereof.

For convenience, the processor cores 518, the graphics processor circuitry 512, the wireless I/O interface 520, the wired I/O interface 530, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 518 and/or the graphics processor circuitry 512. In some embodiments, all or a portion of the bus 516 may be omitted and the components are coupled directly to each other using suitable wired or wireless connections.

Flow charts representative of example hardware logic, machine readable instructions, hardware implemented state machines, and/or any combination thereof for implementing computing device 500, for example, are shown in FIG. 4. The machine-readable instructions may be one or more executable programs or portion(s) of an executable program for execution by a computer processor such as the processor 510 shown in the example computing device 500 discussed above in connection with FIG. 5. The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flow charts illustrated in FIG. 4, many other methods of implementing the example computing device 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example method of FIG. 4 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is a method including detecting an authentication signal from an electronic authentication module; authenticating the authentication signal using a stored user profile, wherein the stored user profile is used for login authentication purposes and includes at least user data; and when the authentication signal is authenticated, activating an electromechanical mechanism to release a latch switch associated with a lock mechanism.

In Example 2, the subject matter of Example 1 can optionally include wherein authenticating the authentication signal using a stored user profile comprises comparing the detected authentication signal from the electronic authentication module with the user data in the stored user profile.

In Example 3, the subject matter of any one of Examples 1-2 can optionally include wherein activating the electromechanical mechanism to release the latch switch associated with the lock mechanism comprises toggling a general-purpose input/output (GPIO) signal.

In Example 4, the subject matter of any one of Examples 1-3 can optionally include wherein the latch switch is released for a predetermined amount of time.

In Example 5, the subject matter of any one of Examples 1-4 can optionally include wherein when the latch switch is released, in response to a user input within the predetermined amount of time, the lock mechanism is moved to an unlock position.

In Example 6, the subject matter of any one of Examples 1-5 can optionally include wherein the lock mechanism is compatible with a Kensington lock cable, and wherein the lock mechanism facilitates moving the lock mechanism to an unlock position with a physical key.

In Example 7, the subject matter of any one of Examples 1-6 can optionally include wherein the authentication signal is a fingerprint signal, and wherein the electronic authentication module is a fingerprint scanner.

Example 8 is at least one non-transitory machine-readable storage medium comprising instructions that, when executed, cause at least one processing device to at least: detect an authentication signal from an electronic authentication module; authenticate the authentication signal using a stored user profile, wherein the stored user profile is used for login authentication purposes and includes at least user data; and when the authentication signal is authenticated, activate an electromechanical mechanism to release a latch switch associated with a lock mechanism.

In Example 9, the subject matter of Example 8 can optionally include wherein to authenticate the authentication signal using a stored user profile, the instructions that, when executed, further cause the at least one processing device to compare the detected authentication signal from the electronic authentication module with the user data in the stored user profile.

In Example 10, the subject matter of any one of Examples 8-9 can optionally include wherein to activate the electromechanical mechanism to release the latch switch associated with the lock mechanism, the instructions that, when executed, further cause the at least one processing device to toggle a general-purpose input/output (GPIO) signal.

In Example 11, the subject matter of any one of Examples 8-10 can optionally include wherein the latch switch is released for a predetermined amount of time.

In Example 12, the subject matter of any one of Examples 8-11 can optionally include wherein when the latch switch is released, in response to a user input within the predetermined amount of time, the lock mechanism is moved to an unlock position.

In Example 13, the subject matter of any one of Examples 8-12 can optionally include wherein the lock mechanism is compatible with a Kensington lock cable, and wherein the lock mechanism facilitates moving the lock mechanism to an unlock position with a physical key.

In Example 14, the subject matter of any one of Examples 8-13 can optionally include wherein the latch switch is a spring-loaded latch switch.

Example 15 is an apparatus comprising: one or more processors to: detect an authentication signal from an electronic authentication module; authenticate the authentication signal using a stored user profile, wherein the stored user profile is used for login authentication purposes and includes at least user data; and when the authentication signal is authenticated, activate an electromechanical mechanism to release a latch switch associated with a lock mechanism.

In Example 16, the subject matter of Example 15 can optionally include wherein to authenticate the authentication signal using a stored user profile, the one or more processors further compare the detected authentication signal from the electronic authentication module with the user data in the stored user profile.

In Example 17, the subject matter of any one of Examples 15-16 can optionally include wherein to activate the electromechanical mechanism to release the latch switch associated with the lock mechanism, the one or more processors further toggle a general-purpose input/output (GPIO) signal.

In Example 18, the subject matter of any one of Examples 15-17 can optionally include wherein the latch switch is released for a predetermined amount of time.

In Example 19, the subject matter of any one of Examples 15-18 can optionally include wherein when the latch switch is released, in response to a user input within the predetermined amount of time, the lock mechanism is moved to an unlock position.

In Example 20, the subject matter of any one of Examples 15-19 can optionally include wherein the lock mechanism is compatible with a Kensington lock cable, and wherein the lock mechanism facilitates moving the lock mechanism to an unlock position with a physical key.

Example 21 is a system including one or more processors coupled to a memory, wherein the one or more processors are operative to perform the method of any one of Examples 1 to 7.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method performed by a single processing device comprising a device case, one or more processors within the device case, and a locking mechanism coupled to the device case, the locking mechanism including a mechanical locking mechanism and an electromechanical locking mechanism, the mechanical locking mechanism to be toggled between a locked position and an unlocked position using a physical key inserted in a key receptacle accessible through the device case, the method comprising:
   detecting, by an authentication module implemented at least partly in program code executed by at least one of the one or more processors, an authentication signal from a fingerprint scanner, a face scanner, or an iris scanner;
   authenticating the authentication signal using a stored user profile of a user, wherein the stored user profile is used by the user to log in the single processing device and includes at least user data associated with the user; and
   upon the authentication signal being authenticated, activating the electromechanical locking mechanism of the single processing device to release a latch switch of the single processing device to allow the mechanical locking mechanism to be toggled from the locked position to the unlocked position.

2. The method of claim 1, wherein authenticating the authentication signal using a stored user profile comprises comparing the detected authentication signal with the user data in the stored user profile.

3. The method of claim 1, wherein activating the electromechanical locking mechanism comprises toggling a general-purpose input/output (GPIO) signal.

4. The method of claim 1, wherein the latch switch is released for a predetermined amount of time.

5. The method of claim 4, wherein when the latch switch is released, in response to a user input within the predetermined amount of time, the locking mechanism is moved to an unlock position.

6. The method of claim 1, wherein the locking mechanism includes a lock hole to receive a lock cable head, wherein when the mechanical locking mechanism is in the locked position, the lock cable head is prevented from being removed from the lock hole.

7. At least one non-transitory machine-readable storage medium comprising instructions that, when executed, cause a single processing device to perform operations, the single processing device comprising a device case, one or more processors within the device case, and a locking mechanism coupled to the device case, the locking mechanism including a mechanical locking mechanism and an electromechanical locking mechanism, the mechanical locking mechanism to be toggled between a locked position and an unlocked position using a physical key inserted in a key receptacle accessible through the device case, the operations comprising:
  detecting, by an authentication module implemented at least partly in program code executed by at least one of the one or more processors, an authentication signal from a fingerprint scanner, a face scanner, or an iris scanner;
  authenticating the authentication signal using a stored user profile of a user, wherein the stored user profile is used by the user to log in the single processing device for users logging into the processing device and includes at least user data associated with the user; and
  upon the authentication signal being authenticated, activating the electromechanical locking mechanism of the single processing device to release a latch switch of the single processing device to allow the mechanical locking mechanism to be toggled from the locked position to the unlocked position.

8. The at least one non-transitory machine-readable storage medium of claim 7, wherein to authenticate the authentication signal using a stored user profile, the instructions that, when executed, further cause the single processing device to compare the detected authentication signal with the user data in the stored user profile.

9. The at least one non-transitory machine-readable storage medium of claim 7, wherein to activate the electromechanical locking mechanism comprises toggling a general-purpose input/output (GPIO) signal.

10. The at least one non-transitory machine-readable storage medium of claim 7, wherein the latch switch is released for a predetermined amount of time.

11. The at least one non-transitory machine-readable storage medium of claim 10, wherein when the latch switch is released, in response to a user input within the predetermined amount of time, the locking mechanism is moved to an unlock position.

12. The at least one non-transitory machine-readable storage medium of claim 7, wherein the locking mechanism includes a lock hole to receive a lock cable head, wherein when the mechanical locking mechanism is in the locked position, the lock cable head is prevented from being removed from the lock hole.

13. The at least one non-transitory machine-readable storage medium of claim 7, wherein the latch switch is a spring-loaded latch switch.

14. A single processing device comprising:
  a device case;
  one or more processors within the device case;
  a locking mechanism coupled to the device case, the locking mechanism including a mechanical locking mechanism and an electromechanical locking mechanism, the mechanical locking mechanism to be toggled between a locked position and an unlocked position using a physical key inserted in a key receptacle accessible through the device case;
  an authentication module implemented at least partly in program code executed by at least one of the one or more processors, the authentication module to:
    detect an authentication signal from a fingerprint scanner, a face scanner, or an iris scanner;
    authenticate the authentication signal using a stored user profile of a user, wherein the stored user profile is used by the user to log in the single processing device and includes at least user data; and
    upon the authentication signal being authenticated, activate the electromechanical locking mechanism of the single processing device to release a latch switch of the single processing device to allow the mechanical locking mechanism to be toggled from the locked position to the unlocked position.

15. The single processing device of claim 14, wherein to authenticate the authentication signal using a stored user profile, the one or more processors further compare the detected authentication signal with the user data in the stored user profile.

16. The single processing device of claim 14, wherein to activate the electromechanical locking mechanism, the one or more processors further toggle a general-purpose input/output (GPIO) signal.

17. The single processing device of claim 14, wherein the latch switch is released for a predetermined amount of time.

18. The single processing device of claim 17, wherein when the latch switch is released, in response to a user input within the predetermined amount of time, the locking mechanism is moved to an unlock position.

19. The single processing device of claim 14, wherein the locking mechanism includes a lock hole to receive a lock cable head, wherein when the mechanical locking mechanism is in the locked position, the lock cable head is prevented from being removed from the lock hole.

* * * * *